(12) United States Patent
Swift et al.

(10) Patent No.: US 7,307,112 B2
(45) Date of Patent: *Dec. 11, 2007

(54) ELECTRICAL COMPONENT WITH FILLERS HAVING SEMI-RESISTIVE PROPERTIES AND COMPOSITE SYSTEMS COMPRISING THE SAME

(75) Inventors: Joseph A. Swift, Ontario, NY (US); Ihor W. Tarnawskyj, Webster, NY (US); T. Edwin Freeman, Webster, NY (US); Edward B. Caruthers, Jr., Rochester, NY (US); Constance J. Thornton, Ontario, NY (US)

(73) Assignee: Xerox Corporation, Stamford, CT (US)

(*) Notice: Subject to any disclaimer, the term of this patent is extended or adjusted under 35 U.S.C. 154(b) by 984 days.

This patent is subject to a terminal disclaimer.

(21) Appl. No.: 10/059,740

(22) Filed: Jan. 31, 2002

(65) Prior Publication Data

US 2003/0144388 A1  Jul. 31, 2003

(51) Int. Cl.
*C08K 3/04* (2006.01)
*C08K 3/22* (2006.01)
*C08K 3/40* (2006.01)

(52) U.S. Cl. .................. 524/79; 524/430; 524/494

(58) Field of Classification Search .......... 524/99, 524/79, 430, 494
See application file for complete search history.

(56) References Cited

U.S. PATENT DOCUMENTS

| | | | |
|---|---|---|---|
| 5,079,037 A | 1/1992 | Morrison et al. | |
| 5,139,862 A | 8/1992 | Swift et al. | |
| 5,794,100 A | 8/1998 | Bell et al. | |
| 5,812,908 A | 9/1998 | Larocca et al. | |
| 5,843,567 A | 12/1998 | Swift et al. | |
| 5,885,683 A | 3/1999 | Swift | |
| 6,031,711 A * | 2/2000 | Tennent et al. | 361/303 |
| 6,214,921 B1 | 4/2001 | Bluett et al. | |
| 6,265,046 B1 * | 7/2001 | Swift | 428/88 |
| 6,312,792 B1 * | 11/2001 | Okada et al. | 428/220 |
| 6,761,978 B2 * | 7/2004 | Mosher et al. | 428/474.4 |

* cited by examiner

*Primary Examiner*—Kriellion A Sanders
(74) *Attorney, Agent, or Firm*—Nixon Peabody LLP

(57) ABSTRACT

The present invention relates to an electrical component, which has an electrically conductive composition that is stable at high temperatures, and includes a partially pyrolized carbon based powder filler and a host matrix. The present invention also relates to an electrophotographic system which further is stable at conventional ambient environmental use conditions, such as different humidity levels and/or ambient temperature ranges.

30 Claims, No Drawings

ELECTRICAL COMPONENT WITH FILLERS HAVING SEMI-RESISTIVE PROPERTIES AND COMPOSITE SYSTEMS COMPRISING THE SAME

FIELD OF THE INVENTION

The present invention relates to an electrical component useful in an electrophotographic system, which is made from an electrically conductive composition, that is stable at high temperatures and includes a partially pyrolized carbon based powder filler and a host matrix.

The present invention further relates to an electrophotographic system and/or components thereof which maintain electrically conductive and/or insulating properties when used or tested under different ambient environmental or conventional use conditions, which may include changes in temperature, humidity, etc.

BACKGROUND OF THE INVENTION

Electrostatographic printing machines typically use electrical contacts and devices. In electrostatographic printing devices commonly used today, a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image contained within the original document. Alternatively, a light beam may be modulated and used to selectively discharge portions of the charged photoconductive surface to record the desired information thereon. Typically, such a system employs a laser beam. Subsequently, the electrostatic latent image on the photoconductive insulating surface is made visible by developing the image with developer powder referred to in the art as toner. Most development systems employ a developer which comprises both charged carrier particles and charged toner particles which triboelectrically adhere to the carrier particles. During development, the toner particles are attracted from the carrier particles by the charged pattern of the latent image areas of the photoconductive insulating area to form a powder image on the photoconductive area. This toner image may be subsequently transferred to a support surface, such as copy paper, to which it may be permanently affixed by heating or by the application of pressure, to form the desired copy.

In commercial applications of such printing machines, it is necessary to distribute power and/or logic signals to various sites within the machines. Traditionally, this has required conventional wires and wiring harnesses in each machine to distribute power and logic signals to the various functional elements in an automated machine. In such distribution systems, it is necessary to provide electrical connectors between the wires and components. In addition, it is necessary to provide sensors and switches, for example, to sense the location of copy sheets, documents, etc. Similarly, other electrical devices such as interlocks, and the like are provided to enable or disable a function. These electrical devices usually operate at low power, typically electronic signal potentials of up to 5 volts and at currents in the milliamp regime. Further, many commercial applications employ electrical contact components and related devices that require currents in the regime of 1-100 amps and voltages greater than 5 volts.

Further, conventional electrical devices employ mating pairs of electrical contacts which are made from metal, or, base metal overplated with additional metals or metal alloys. High contact loads, for example 100 grams to 500 grams, are typically required with these metal contact systems which contribute to long term wear out of mechanical springs, etc., and to the mechanical and tribological deterioration of the contact surfaces by abrasion, wear, crushing, deformation, and the like.

Conventional electrical components are disclosed in U.S. Pat. No. 5,599,615 to Swift et al., U.S. Pat. No. 5,270,106 to Orlowski et al., U.S. Pat. Nos. 5,139,862, 5,250,756 to Swift et al., and Swift et al., "Static Eliminator Brush Structure," XEROX DISCLOSURE JOURNAL, Vol. 10, No. 2, page 109-110 (March/April 1985).

U.S. Pat. No. 5,744,090 to Jones et al., discloses a process for the manufacture of conductive fibers usable in electrostatic cleaning devices, where magnetic, electrically conductive material is used.

In electophotography, there is a common need for inexpensive, easily fabricated, resistive polymeric matrix compositions, such as films or resins, etc., such as for use in electrical contacts and devices, which vary over a substantial resistance range. The resistance of the films is changed by varying the quantity of conductive material dispersed in an insulating binder. A greater resistance is achieved by lower loadings of the conductive material, where small decreases in loading of conductive materials at the percolation threshold cause dramatic increases in resistance. Typically, such materials have a surface resistivity in the range of about $10^2$ ohms/square to $10^8$ ohms/square and a thickness in the range of about 1.0 micron to 500 microns. For example, thin films having resistivities controlled to fall within such ranges, are used to overcoat other materials to comprise a multiple-layer component. As a result, the surface layer of such a coated component exhibits static discharge, electrostatic bleed-off behaviors, and other similar characteristics. However, it is difficult to control and maintain films or resin based composites associated with known resistivity values or resistivity ranges precisely due to sudden resistance changes that are caused by improper selection of material compositions used to make the subject films or resin composites and which occur at specific percolation thresholds. Dramatic increases in resistance are observed when conductive particles are incorporated into such composite materials, which render material composites conductive.

Conductive particles have been loaded in composites in varying quantities to control resistance levels. Light loadings of conductive particles to insulating host polymers have been attempted to eliminate dramatic increases in resistance at specific percolation thresholds. However, the ability to precisely control material properties of such a composite is hampered by inhomogeneities that result from poor quality dispersion of small filler material amounts to a host matrix polymer. To reduce this effect, less conductive filler materials have been used at relatively high loadings. For example, different metal, metal oxide containing particles and carbon black particles have been used in attempts at achieving tightly controlled electrical resistivities. However, high loadings of particles in a film are known to make the film hard or brittle.

An example of the need for resistive compositions with controlled electrical properties can be found in corona charging devices, such as scorotrons. The flat scorotron is a current charging device based on a concept in European Patent Publication No. 0-274-895 to Gundlach et al. The device comprises a set of thin conductive lines deposited on a substrate and is used to replace the free-standing corona wire in a typical electrophotographic device. A flat scorotron has a number of advantages over other corona charging devices, such as being easier to clean, less likely to break because of paper misfeed or cleaning, and inexpensive to produce. However, the device suffers from a number of problems. Any differences in the microstructure of the pins causes each pin to form a corona at a slightly different voltage. Once a corona forms at the end of a pin, the voltage on the array of pins drops, because the corona sustaining voltage is less than the corona onset voltage. The drop in voltage prevents other pins from, forming a corona. This self-limiting behavior can be overcome by including current limiting resistances between each pin and the bus bar, which supplies the high voltage to all of the pins in the array. However, it is difficult to control the individual distributed resistances between the pins and bus, because the required resistivity for such devices is at the edge of the percolation threshold for most materials. Any small, local changes in composition result in large changes in resistivities making it difficult to obtain a precisely controlled and uniform resistivity.

A general example of the need for resistive matrix compositions can be found in simple voltage sensors for electrostatically charged surfaces. A high voltage sensor fabricated with a resistive film bleeds only a small quantity of charge from a surface leaving the charge density nearly unchanged. The need for resistive compositions also can be found in document sensing devices in xerographic copying machines. As a document or paper passes between an electrical contacting brush and a resistive film, the resistance of the circuit is changed. A sensing circuit will produce a signal indicative of the presence and position of the paper and the document path may be corrected. See H. Rommelmann et al, Xerox Disclosure Journal 12(2) 81-2 (1987).

Fibers having electrically conductive properties have been used to achieve conductive compositions. For example, U.S. Pat. No. 4,491,536 to Tomoda et al. discloses a composition comprising a fluoroelastomer and carbon fibers having a length of 0.1 millimeters to 5 millimeters. A volume "resistivity" of $10^{-1}$ ohm-cm to $10^{13}$ ohm-cm can be achieved with that composition. A slight increase in the loading of carbon fiber may produce a dramatic change in volume resistivity of as much as 12 orders of magnitude difference. Thus, slight inconsistencies in the composition may lead to large changes in resistivity, especially in compositions having about 15% to 25% by weight fibers.

U.S. Pat. No. 4,569,786 to Deguchi discloses an electrically conductive composition comprising metallic and carbon fibers dispersed in a thermoplastic resin. The metallic and carbon fibers have a length of from 0.5 mm to 10 mm and are provided to impart a high degree of conductivity to the composition.

U.S. Pat. No. 3,406,126 to Litant discloses a conductive synthetic resin composition containing carbon filaments having a length of ¼ inch to ¾ inch in length.

U.S. Pat. No. 4,810,419 to Kunimoto et al. discloses a shaped electroconductive aromatic imide polymer article comprising an aromatic imide polymer matrix and 10% to 40% by weight of 0.05 mm to 3.0 mm long carbon fibers.

In general, desired resistivity of a conductive composition may be achieved by controlling the loading of the conductive particles and/or other filler materials. Very small changes in loading of conductive filler materials near a threshold value at which conduction occurs, i.e., percolation threshold, can cause dramatic changes in a composition's conductivity. Furthermore, differences in any of the fibers, filler materials, etc., such as particle form, size and shape can cause wide variations in conductivity at even a constant weight loading. Moreover, the percolation threshold approach requires sufficiently high concentrations of conductive particles, wherein such concentration levels allow for conductive particle-to-particle contacts, which span the thickness of the composite, resulting in a burst of conductivity at the point where a first continuous particle chain is formed. As conventionally known in the art, conductive filler materials generally have D.C. volume resistivity values of less than about $10^{-4}$ to $10^{-6}$ ohm-cm, while insulating materials, on the other hand, generally have resistivity values of greater than $10^{13}$ ohm-cm to $10^{14}$ ohm-cm. "Controlled conductivity" materials, of intermediate resistivities, may have resistivity values ranging from about $10^{-6}$ ohm-cm to about $10^{13}$ ohm-cm.

In these and other references, the emphasis has been primarily on achieving highly conductive compositions, where a resulting resistivity is typical of that at, or slightly above, a percolation threshold values for specific material compositions, which are achieved by the use of highly conductive fiber or fillers of the prior art. However, maintaining a resistivity value slightly beyond such a percolation limit is difficult to control accurately and precisely, based upon variations in compositions used and inconsistencies of the materials contained therein, such as even small differences in final loading of fibers, fillers etc. In addition, small variations of fiber loadings within a component may lead to significant performance variations within that component leading to localized problems such as degraded performance in random, small regions of the component. Moreover, depending on the materials used in a composition, materials may become brittle due to slight variations resulting in changes in the mechanical properties associated with such compositions. It is further known that low conductivity values are required, and often necessary, for electrophotographic image development systems, wherein the intrinsic electrical conductivity of materials used in a composition make it extremely difficult to achieve predictable and reproducible conductivity values.

There continues to be a need for materials having intermediate and stable resistivity suitable for use in the present invention that can be precisely controlled to avoid inhomogeneities in resistivity within such polymeric-based compositions, such as for resins, films, etc. which can be formed from low cost and commercially available materials.

SUMMARY OF THE INVENTION

The present invention relates to an electrical component, which is made from an electrically conductive composition, that is stable at high temperatures and includes a partially pyrolized carbon based powder filler and a host matrix. The host matrix also may have associated electrically conductive or insulating properties.

Another aspect of the present invention relates to an electrophotographic system, which includes an electrically conductive composition that is stable at high temperature and includes a partially pyrolized carbon based powder filler and a compatible host matrix.

The present invention further relates to an electrophotographic system and/or components thereof which maintain electrically conductive and/or insulating properties when used or tested under different ambient environmental or conventional use conditions, which may include changes in temperature, humidity, etc.

The electrically conductive composition of the present invention can be utilized in a wide variety of component applications requiring the use of polymer-based composites, such as elastomer-based composites used in xerographic printing components. Significantly, electrical components made from this composition achieve a tight degree of control of electrical resistivity compared to conventional systems.

DETAILED DESCRIPTION OF THE INVENTION

The present invention relates to an electrical component, which is made from an electrically conductive composition, that is stable at high temperatures and includes a partially pyrolized carbon based powder filler and a host matrix. The host matrix also may have associated electrically conductive or insulating properties.

Another aspect of the present invention relates to an electrophotographic system, which includes an electrically conductive composition that is stable at high temperature and includes a partially pyrolized carbon based powder filler and a compatible host matrix. The system further may have a component having an electrically conductive composition containing a plurality of electrical point contacts or contacting elements located at one or more of its ends.

The present invention further relates to an electrophotographic system and/or components thereof which maintain electrically conductive and/or insulating properties when used or tested under different ambient environmental or conventional use conditions, which may include changes in temperature, humidity, etc.

In accordance with the present invention, an electrical component is provided as represented by a variety of electrical devices for conducting electrical current, such as switches, sensors, connectors, interlocks, and the like. These electrical devices have greatly improved reliability, are of low cost, are easily manufacturable, and are capable of reliably operating at low contact loads in a wide variety of electric and electrostatic circuits. Other electrical components which can be produced in conjunction with the present invention, such as in an electrophotographic system, which are also provided for, include electrophotographic process components, such as intermediate transfer belts, bias transfer belts, bias charging belts, developer rolls, developer belts, bias transfer rolls, fuser rolls, pre and mid heater belts, fuser belts, pressure rolls, donor rolls, and bias charging rolls.

Typically these devices are low energy, electrostatic devices, using voltages within the range of millivolts to kilovolts and currents within the range of microamps to milliamps, as opposed to high power applications of hundreds to thousands of amperes.

Although the present invention may be used in certain applications in the milliamp to tens of amps region, it is noted that best results are obtained in high resistance circuitry where power losses attributable to the subject devices can be tolerated. It is also noted that these devices may be used in certain applications in the very high voltage region in excess of 5,000 volts to 10,000 volts, for example, where undesirable electrostatic potentials can be generated by triboelectric forces.

In addition to performing an electrical function, an electrophotographich system and/or an electrical components thereof, the present invention may also provide a mechanical or structural function. Examples of such components include a column beam, lever arm, leaf or other type of spring, recesses, grooves, slides, snap fits, and the like. The above advantages are enabled through the use of a manufacturing processes known generally as injection molding, transfer injection molding, resin transfer molding, casting, extrusion, and pultrusion.

According to the present invention, an electrical component, which may be used in an electrophotographic system, may have contact of one of its surfaces with another element of an electric circuit, which leads to direct electric contact to a substantial number of contact points within the subject electrical conductive composition, which results in reliable electric contact between the component and its corresponding mating circuit elements. Moreover, the present invention may have a plurality of electrical point contacts which form an essentially continuous path from one end of the electrical component to the other end.

A variety of suitable fillers, fibers, or matrices may be used as part of an electrically conductive composition of the present invention. Further, the electrically conductive composition may include a host matrix, which may also be comprised of such fillers, fibers or matrices and which may have electrically conductive or insulating properties based upon the electrical or insulating properties of those materials.

In one aspect of the present invention, suitable fillers, fibers, matrices, etc., may be partially pyrolized and/or used in a powder form. In accordance with the present invention, to obtain fibers or powder forms having a submicroscopic size, fiber material may be subjected to conventionally used methods suitable for the conversion of fiber to powder form, which may include, but are not limited to mechanical chopping, grinding, cryogenic grinding, milling, micro-milling, and other high shear attrition methods. Examples of conventional grinding techniques suitable for use in the present invention, may include, but are not limited to ball milling with steel shot, high sheer mixing, attrition, wrist shakers with steel shot and paint shakers with steel shot.

Typically, fillers or fibers of the present invention may be ground by conventional grinding techniques in the presence of one or more pure chemical solvents or liquids. The use of a liquid phase in such a process acts to dissipate heat generated and as a coolant, during mechanical grinding, further facilitating formation of powders having more uniform or consistent particle size and shape, without particle aggregation. In this manner, progressive grinding in a liquid of larger particles ultimately results in the production of progressively finer particles suitable for use in the present invention. Even pre-cut fibers, such as fibers of approximately one centimeter in length, may be ground in the presence of a suitable organic solvent or in a liquified gas. Depending on the method used in the conversion of fiber to powder, the shape of the desired powder form may be controlled to form fine powders in different forms as a spiracle powder, a near spiracle powder, a short-length rod powder, spheres, near spheres, flakes, needles, shards, rods and mixtures and blends thereof.

Liquified gases suitable for use in the present invention, include, but are not limited to, carbon dioxide or nitrogen, which provides also for cryogenic conditions favorable for the milling of fine powders.

Solvents or liquids suitable solvents for use in the present invention include, but are not limited to: pyridine, cyclohexanone, toluene, acetone, dimethylsulfoxide (DMSO), acetonitrile, p-dioxane, methylene chloride, tetrahydrofuran (THF), methanol, dimethylamide, 2-methylbutane, 1,1,1-trichloroethane, propanol, diethyl amine, chloroform, methylethylketone (MEK), methylisobutylketone (MIBK), carbon tetrachloride ($CCl_4$), water, and corresponding mixtures thereof, for example, such as MEK/toluene/water and MEK/toluene.

In another aspect of the present invention, use of different particulate or granular sizes along with the orientation of the fibers or corresponding powder forms in a matrix provides additional ways for controlling chemical, electrical and mechanical properties of the electrical components. In particular, use of fiber materials in different powder forms enable very tight resistivity control, when compared to those conventionally used in the art, where control within several, or perhaps even a few, orders of magnitude is considered normal. Moreover, such fibers or corresponding powder forms when used as fillers are thermally stable, even at high temperatures, making them compatible with host matrix materials including high temperature polymers and other non-polymeric matrix materials.

For example, the present invention also may further use extremely short fibers, which may be in powder form, to enable the coating of uniform thin matrix, such as films having thickness as thin as about one micron. The fibers of the present invention have a submicroscopic fiber length (less than 10 microns and at least less than a micron). The fibers may have a length of about 0.0001 micron to about 5.0 microns. More particularly, the fibers have a length of about 0.01 micron to about 0.5 micron. The fiber lengths should be no greater than the coated film thickness.

Suitable fibers, fillers or matrices for use in the present invention may be or include non-metallic, polymeric or metallic materials.

The term "nonmetallic" is used to distinguish from conventional metal fibers which exhibit metallic conductivity having resistivity of the order of $1 \times 10^{-5}$ ohm-cm to about $1 \times 10^{-6}$ ohm-cm and to define a class of fibers which are nonmetallic but can be treated in ways to approach or provide metal-like properties, which include electrical conductivity and magnetic activity. For example, the present invention may use nonmetallic conductive fibers or corresponding powder forms that have a DC volume resistivity of from about $2 \times 10^{-5}$ ohm-cm to about $1 \times 10^{11}$ ohm-cm, more particularly from about $1 \times 10^{-4}$ ohm-cm to about 10 ohm-cm, to dissipate excess or unwanted electrostatic build up and to minimize resistance losses and suppress radio frequency interference (RFI) of a component employing such fiber or powder. The upper range of resistivities of up to $1 \times 10^{11}$ ohm-cm or even $9 \times 10^{12}$ ohm-cm may be used in special applications involving extremely high fiber or particle densities where the individual fibers have a high particle resistivity and when used in tightly packed particle-arrays within the polymer matrix can act as individual resistors in parallel thereby lowering the overall resistance of the component enabling a very low, but easily controlled, current conduction. However, the vast majority of applications in the present invention will require fibers or corresponding powder forms having resistivities within the earlier stated range to enable current conduction or electrostatic dissipation that is precisely tuned to and suitable for the requirements of the application.

Suitable nonmetallic fillers or corresponding powder forms used in the present invention, may include, but are not limited to, carbon, carbon based fibers, such as carbon-graphite fibers, carbon coated ceramic materials, blends thereof, and the like, which may or may not undergo pyrolysis. Examples of suitable carbon based fibers, corresponding powder forms or matrices containing them for use in the present invention, may include, but are not limited to glass, metal-plated glass, metal particle filled glass, carbon-coated glass, ceramic materials, carbon-coated ceramic materials, carbon containing ceramic materials, and organic fibers.

An advantage of using conductive carbon fibers or powders is that such fibers have negative coefficients of thermal conductivity, i.e., as temperature increases the fiber resistance decreases, such that as individual fibers become hotter with passage of a spurious high current surge, the fibers become more conductive. This provides an advantage over metal contacts since metals operate in just the opposite manner where metal contacts tend to become more resistive upon heating and thereby weld, burn out, or self destruct. A further advantage of using carbon fibers or powders is that their surfaces are inherently rough and porous, thereby providing better adhesion to the matrix. In addition, the inertness of the carbon material yields a contact surface relatively immune to corrosion when compared to most metals.

A suitable filler for use in the present invention is partially pyrolized carbon based powder filler. Such pyrolized carbon based powder filler materials have unique electrical and mechanical properties and are derived from the use of "very pure raw materials" coupled with an automated manufacturing process where the atmosphere, heat and tension are precisely controlled during the entire carbonization processes ((see, Hsieh and Wei, Semiconducting Polymers Text, page 224-233 (1994), which is hereby incorporated by reference in its entirety).

An example of a partially pyrolized carbon based powder filler is partially carbonized polyacrylonitrile ("PAN") precursor fibers. Polyacrylonitrile based carbon fibers are commercially available as continuous filament yarns having, for example, 1, 3, 6, 12, or up to 160 thousand filaments per yarn. Examples of commercially available PAN fibers produced in yarn bundles of 1,000 to 160,000 filaments have been made and distributed by Akzo Nobel Fortafil Fibers, Zoltek Corp., BP Amoco, and others. Alternatively, those yarn bundles, or "tows", i.e., another term for carbon fibers produced in yarn bundles of 1,000 to 160,000 filaments, may be partially carbonized in a two-stage process involving stabilizing the PAN fibers at temperatures of the order of 300° C. in an oxygen atmosphere.

In accordance with the present invention, a wide range of resistivities is achieved via use of such partially carbonized "PAN" fibers, which may be in a powder form, by temperature controlled heat processing. Such processing involves careful control of carbonization temperatures within certain limits resulting in the production of carbonized carbon fibers or powders with precise electrical resistivities. During the first processing stage "preox"-stabilized PAN fibers are produced, which are intermediate fibers that are black in color, relatively large in diameter, and nonconductive. This is followed by a second or intermediate stage of processing, where further carbonization processing of the "pre-ox" fibers at progressively elevated temperatures in an inert (nitrogen) atmosphere to produce to intermediate level materials with specific physical, chemical, electrical or mechanical properties, such as wide range of resistivity values. At highest processing temperatures, which may be in a range from 300° C., to 1800° C.-1900° C., used for the conversion of such polyacrylonitrile fibers, which may be in yarn or tow forms, an inert fiber, about 99.99% elemental carbon is produced that resists oxidation.

For use in the present invention, partially carbonized PAN fibers made by carbonization of PAN preox at intermediate or second stage temperatures may be ground into a powder form by any suitable conventional mechanical grinding means to convert fibers into powders. The partially carbonized or pyrolized carbon based powders, such as PAN powder, may have any suitable particle size (e.g., 1 nanometers to 10 micrometers) and particle shape (e.g., spherical, round, or cylindrical, or mixtures of sizes and shapes such as spheres, near spheres, flakes, needles, shards, rods and mixtures and blends thereof) in a concentration suitable to render the desired properties in the resultant composition. The partially pyrolized carbon powder fillers, which may be spherically shaped and/or fine powders, have a particle size of from about 0.001 microns to about 10 microns, especially those partially pyrolized carbon powder fillers having a particle size of about 0.001 microns to about 10 microns, while cylindrical filler have a cross section and a cross section diameter of from about 4 micrometers to about 50 micrometers, where the length to cross-sectional diameter ratio is 0.1 to 100. Alternatively, the partially pyrolized carbon powder fillers have a particle size of less than about 0.9 microns.

In another aspect of the present invention, a pyrolized carbon powder matrix composition comprises about 0.1% to about 99% by weight pyrolized carbon powder fillers, or at least 5% to 50% by weight pyrolized carbon powder fillers.

In accordance with the present invention, it has been found that use of such PAN powder forms, significantly enable very tight resistivity control when compared to those conventionally used in the art, where control within several orders of magnitude is otherwise considered normal. For example, D.C. electrical resistivity of the resulting pyrolized carbon based powder fillers is controlled by the selection of the temperature of carbonization where carbon fibers having D.C. resistivities of $10^{-2}$ ohm-cm to about $10^{-6}$ ohm-cm result from treatment temperatures of up to 1800° C. to 2000° C., while a particularly desired resistivity of $10^4$ to $10^6$ is achieved if the carbonization temperature is controlled in the range of from about 500° C. to 750° C. Similarly, other such partially pyrolized carbon based powder filler can be produced having a D.C. volume resistivity of from about $1 \times 10^{-5}$ ohm-cm to about $1 \times 10^{13}$ ohm-cm or more particularly from about $1 \times 10^5$ ohm-cm to about 1000 ohm-cm, to dissipate static charges and to minimize resistance losses and suppress radio frequency interference (RFI), by controlling the temperature of the second stage carbonization process from between about 300° C. to about 1800° C.

For further reference to processes that may be employed in making these carbonized fibers attention is directed to the U.S. Pat. No. 4,761,709 to Ewing et al. and the literature sources cited therein at column 8, which are hereby incorporated by reference in their entirety. Typically, these carbon fibers have a modulus of from about 30 million to 60 million psi or 205-411 GPa which is higher than most steels thereby enabling very strong composite members. Metal plated carbon fibers also are available from Novamet Specialty, Inco, and others.

The fibers, fillers or corresponding power forms of the present invention, which are produced as a result of high temperature processing, are stable at high temperatures, making these materials compatible with a variety of host matrix materials, including polymers and non-polymers.

Any suitable polymer matrix may be employed in the practice of the present invention. In general, filler, fiber types, corresponding powder forms and loadings in a polymer matrix as used in the present invention depend upon specific properties of the materials used, such as conductivity associated with individual components, particle size and shape, corresponding dimensions, such as cross-sectional area and diameters, and other mechanical, physical, thermal, and magnetic properties of a final compositional configuration.

Typically, a polymeric matrix may have a specific gravity of from about 1.1 gm/cm$^3$ to about 1.5 gm/cm$^3$ (i.e, gram/cubic centimeter units), foamed polymers may have a specific gravity of less than about 1.1 gm/cm$^3$, while the fibers and related powder forms have a specific gravity of from about 1.5 gm/cm$^3$ to about 2.2 gm/cm$^3$. For example, extremely high fiber particle concentrations, which are greater than 50% by weight and often greater than 75% by weight result in specific gravities of a composition dominated by the filler, which have specific gravity values that fall significantly above that of the unfilled matrix. Such high density composites or compositions are useful for achieving high electrical and high thermal conductivity for use in component designs use in the present invention. Moreover, low density characteristics of the fillers of the present invention also are useful in applications where total weight of the component is important. In contrast, carbon fibers or powders may be present in amounts as low as 1% to 8% by weight of the composition used in an electrical component of the present invention, where use of specific amounts of filler results in control of the electrical conductivity of a composite composition. For example, to achieve a minimal level of current conduction for a given composition, a composite composition of the present invention, a particulate concentration of 5% by weight of a medium to high resistivity carbon fiber is chosen such that the specific gravity of the composite is approximately the same as that of the unfilled matrix, while the resistivity of the composite may be one or more orders of magnitude less than the unfilled matrix material.

Suitable organic polymers for use in the present invention also may be chosen to have specific chemical, electrical, mechanical or physical properties, which may include, but are not limited to, for example, chemical inertness relative to other materials used in a composition, short cure times or specific electrical resistivity values. For example, a polymer may be insulating or conducting. If a difference in cross directional electrical conduction within an insulating matrix is desired, directional alignment of the filler may be chosen such that packing density of the filler along one direction is relatively high with respect to the other direction(s). For example, the filler and matrix polymer can be compressed or stretched along one dimension during the crosslinking or solidification of the composite during the final stages of component fabrication resulting in somewhat differential resistivities along the respective directions.

The present invention may further use one or more organic polymers as a host matrix. Moreover, suitable organic polymer fibers, fillers or corresponding powders, which may be partially pyrolized, may be combined with suitable matrix resins to form compositions used in electrical components of the present invention. Such fibers or corresponding powder forms are inert, easy to disperse and compatible with a host matrix suitable for use in the present invention. For example, individual non-metallic, conductive fibers based upon carbonized or partially carbonized polymeric fibers or corresponding powder forms may be blended with a non-conductive or conductive non-metallic matrix material. The matrix may itself contain conventional carbon powder or other suitable nonmetallic fillers.

Resistive polymeric matrix materials suitable for use in the present invention may be selected from the group consisting of a film, a thermoplastic resin, a thermosetting resin, or a polymer. The matrix may consist of a single constituent, or alternatively, the matrix of the present invention may consist of more than one resin appropriately mixed or blended to result in the desired combination of properties achieved by mixing. A solution may be used to achieve complete phase intermixing of the various ingredients. For example, short fibers, which may be in powder form, of the present invention have intrinsic resistivities differing by many orders of magnitude. Selected short fibers or corresponding powder forms having a given intrinsic resistivity are mixed with two different, compatible insulating binder polymers in solution. When a matrix is formed and dried from such a dispersion, a well-connected array of fiber particles exists throughout the polymer film sufficient to produce a DC resistivity of the composite film of the desired value. Further, the fibers or powders tend to reinforce the polymer binders to produce a more durable film. Alternatively, short powder fibers having an intrinsic resistivity which is selectable over many orders of magnitude are mixed with an insulating prepolymer such as monomers, oligomers, or mixtures of monomers and oligomers, and with polymerization initiators such that the fibers and prepolymer have approximately equal volumes. For example, when a matrix is formed and cured from such a mixture, a well-connected array of fibers, fillers or corresponding powder forms extend throughout the polymer matrix.

Examples of matrix resins suitable for use in the present invention also may be selected from thermoplastic and thermosetting resins. Examples of organic polymers, which may also be used as a host matrix or matrix resins, which may have electrically conductive, resistive or insulating properties. In addition, a host matrix may further be comprised of one or more organic polymers. Polymers suitable for use in the present invention include, but are not limited to, polyesters, polyamides, polyvinyls, poly-cellulose derivatives, fluoroelastomers, polysiloxanes, polysilanes, polycarbazoles, polyphenothiazines, polyimides, polyetherketones, polyetherimides, polyethersulphones, polyurethanes, polyether urethanes, polyester urethanes, polyesters, polytetrafluoroethylenes, polycarbonates, polyacrylonitriles and copolymers and mixtures thereof of the above. Examples of co-polymers, include, but are not limited to poly(ester-imides), polyfluoroalkoxys and poly(amide-imides).

Specific examples representative of the preceding general polymeric categories, include specific polymers, such as rayon, polypropylene, nylon, epichlorohydrin, viton, chloroprene, silicone, polyacrylonitrile, methyl methacrylate monomers, hydroxyethyl methacrylate trimers, diphenylmethane diisocyanate, and hydroxyethyl methacrylate, polyacetylene, poly-p-phenylene, polypyrrole, polyaluminophthalocyanine fluoride, polyphthalocyanine siloxane, polyphenylene sulfide, poly(methylmethacrylate), polyarylethers, polyarylsulfones, polysulfones, polybutadiene, polyether sulfones, polyethylene, polypropylene, polymethylpentene, polyphenylene sulfides, polystyrene and acrylonitrile copolymers, polyvinyl chloride, polyvinyl acetate, poly(vinyl butyral) (PVB), poly(ester-imide), polyfluoroalkoxy and poly(amide-imide), silicones, and copolymers thereof. above.

In accordance with the present invention, fluoroelastomers are suitable materials for use as the matrix in the present invention as described in detail in U.S. Pat. No. 4,257,699 to Lentz, U.S. Pat. No. 5,017,432 to Eddy et al., and U.S. Pat. No. 5,061,965 to Ferguson et al., which are hereby incorporated by reference in their entirety. As described therein, such suitable fluoroelastomers for use in the present invention, are particularly from the class of copolymers, terpolymers, and tetrapolymers of vinylidenefluoride hexafluoropropylene, tetrafluoroethylene, and cure site monomers (believed to contain bromine) known commercially under various designations as Viton A, Viton E60C, Viton E430, Viton 910, Viton GH, Viton GF and Viton F601C. The Viton designation is a Trademark of E. I. DuPont deNemours, Inc. Other commercially available materials suitable for use in the present invention, include Fluorel 2170, Fluorel 2174, Fluorel 2176, Fluorel 2177 and Fluorel LVS 76, Fluorel being a Trademark of 3M Company. Additional suitable commercially available materials include Aflas a poly/propylene-tetrafluoroethylene) copolymer, Fluorel II a poly(propylene-tetrafluoroethylene-vinylidenefluoride) terpolymer both also available from 3M Company. Also, the Tecnoflons identified as FOR-60KIR, FOR-LHF, NM, FOR-THF, FOR-TFS, TH, TN505 are available from Ausimont Chemical Co.

Typically, such fluoroelastomers may be cured with a nucleophilic addition curing system, such as a bisphenol crosslinking agent with an organophosphonium salt accelerator as described in further detail in the above referenced Lentz patent, and in the Eddy et al. patent, or with a peroxide as described in DuPont's literature in which case a cure site monomer such as bromomethyl perfluorovinyl ether is also necessary. A particularly important embodiment of the hydrofluoroelastomer is that described in U.S. Pat. No. 5,017,432 to Eddy et al., which is hereby incorporated by reference in its entirety. This embodiment provides a fuser member surface layer comprising poly(vinylidenefluoride-hexafluoropropylene-tetrafluoroethylene-cure site monomer believed to contain bromine) where the vinylidenefluoride is present in an amount less than 40 weight percent. Curing is carried out with a dried solvent solution having a nucleophilic curing agent soluble and in the presence of less than 4 parts by weight inorganic base per 100 parts of polymer, the inorganic base being effective to at least partially dehydrofluorinate the vinylidenefluoride. This is described in greater detail in U.S. Pat. No. 5,017,432 to Eddy et al., and U.S. Pat. No. 4,272,179 to Seanor and U.S. Pat. No. 4,264,181 to Lentz et al., which are hereby incorporated by reference in their entirety.

Moreover, if a suitable elastomeric matrix is desired for use in the present invention, a silicone, fluorosilicone or polyurethane elastomer may provide the polymer matrix. Typical specific materials include Hetron 613, Arpol 7030 and 7362 available from Oshland Oil, Inc., Dion Iso 6315 available from Koppers Company, Inc. and Silmar S-7956 available from Vestron Corporation. Other materials may be added to the polymer bath to provide their properties such as corrosion or flame resistance as desired. In addition, the polymer phase may contain other fillers such as calcium carbonate, alumina, silica, or pigments to provide a certain color or lubricants to reduce friction (e.g., in sliding contacts). Further additives to alter the viscosity during processing, surface tension, or to assist in bonding the composition of the present invention to the other materials may be added. Naturally, if the fiber or resulting particulate filler has a sizing applied to it, a compatible polymer should be selected, or alternatively, if a particularly desired polymer matrix is selected a compatible sizing for the filler should be used. For example, if an epoxy resin is being used, it would be appropriate to add an epoxy sizing to the fiber to promote adhesion between the filler and matrix.

Alternate suitable polymeric compounds include, but are not limited to polysilylenes doped with arsenic pentafluoride, iodine, perchlorates, and boron tetrafluorides (see, for example, J. H. Lai, et al, *Solid State Technology*, December 1984, pp. 149-154).

In accordance with the present invention, additional suitable fibers of fillers, which may be in powder form, include, generally alkyls, amines, epoxies, phenol, phenylene oxides, phenoxy resins, cellulose, amines, tetracyanoquinodimethane (TCNQ) salts, and phthalocyanines, etc.

In another aspect of the present invention, fillers, fibers or corresponding powder materials having metallic or magnetic properties may also be used. Suitable electrically conductive, magnetic materials for use in the present invention, include, but are not limited to iron containing carbon black, metal particles (e.g., nickel, iron, cobalt, etc., oxides thereof, and mixtures thereof), as well as powders of the magnetic alloys (e.g., permaloy, molybdenum permaloy and the like).

Suitable for use in the present invention are magnetic materials compatible with host matrix resins and fillers, which are stable under compounding and device manufacturing processes and which show magnetization at the desired working temperature may be used. However, addition of fine, magnetic particulate filler directly within the fiber or directly within the matrix, also may alter the magnetic properties of an electrical component itself or the chemical, physical, mechanical or electrical properties of the other components of a composition of the present invention. An electrical component of the present invention made from an electrically conductive composition may also include such filler materials having magnetic properties.

In accordance with the present invention, choice of fillers and matrix must take into account processing temperatures associated in producing the final product. For example, if ferrite filler and partially carbonized carbon fiber-filler are used as fillers that further combined at high temperature with a high temperature matrix, such as a ceramic material, the final conductivity of that composition of materials may be increased by further carbonization processing of the carbon fiber filler upon exposure to a higher temperature than the temperature at the carbon fiber-filler was originally manufactured. Magnetic properties of the ferrite also may be altered by, for example, by oxidization at the high process temperatures. Alternately, if the high temperature processing occurs in a reducing atmosphere, reduction of the ferrite may result in even different magnetic properties. In addition, potential interactions of the ferrite and carbon fillers must be taken into account as the combination may result in higher or lower resulting resistivities. For example, in situations where the highest processing temperatures are used in production of carbon fibers or powder based composites, then other materials to be used in compositions for use in the present invention should be chosen with corresponding high conductivities, i.e., e.g., nickel or strontium based fillers may be better choices than ferrites, as these materials may withstand the process conditions better and exhibit less interactions. The fiber used in this case may be an Amoco THORNEL™, carbon fiber such as T300™, and T650™.

In addition to the incorporation of suitable magnetic particles into a host matrix, fibers, etc. of the present invention, optional overcoating on such fibers, fillers, resins, etc. and optional overcoating on a component, or a combination thereof by the following preparation techniques also may be used in the present invention. The present invention provides for a composition consisting of at least a matrix and fiber-based filler.

In addition, the composition of the present invention, which may be electrically conductive, may contain suitable magnetic particles which may be converted into a composition of the present invention by methods as described herein. The present invention involves the use of high shear blend mixing of small particle size, magnetic filler or corresponding powders directly into the resin prepolymer. In addition to the partially carbonized fiber particles, any suitable magnetic particles, such as soft ferrites, hard ferrites (e.g., strontium, lead, barium), neodymium iron boride, nickel, and cobalt alloys, and the like, having any suitable particle size (e.g., 1 nanometers to 10 micrometers) and shape (e.g., such as spherical, round, or cylindrical, or mixtures of sizes and shapes, which may include corresponding powders) may be used in suitable concentration to render the desired magnetic properties in the resultant composition. While magnetic particle concentrations of between 0.01% and 500% based upon the weight of the resin may be used, consideration of the optimum ratio involves the tradeoff amongst magnetic effect, electrical resistivity, loss of mechanical strength of the composite, increase in density, and cost.

Thus, another aspect of the present invention, employs the minimum amount of magnetic particulate fillers or powders, for example less than 200% by weight, or at least less than 50% of the polymer. These loadings are based upon the initial weight of polymer which is a convention used in the composites industry. Importantly, these concentrations will equate to lower overall loadings once the polymer is composited with the fiber and other components of the final composite. The mixture of magnetic particles, liquid crosslinking polymer resin, and suitable catalyst is then used with suitable thermosetting resin for formation into a solid composite which is suitable for manufacture of the desired component.

Suitable materials and fabrication processes for the magnetic particles are disclosed in U.S. Pat. Nos. 4,238,558 and 4,474,866 to Ziolo, the disclosures of which are hereby incorporated by reference in their entirety.

Magnetic particles, and the preparation methods for these magnetic particles, are those described in U.S. Pat. No. 5,667,924 to Ziolo, which is hereby incorporated by reference in its entirety, where the disclosed magnetic nanoparticles include a magnetic core and a polymeric material which at least partially covers the magnetic core.

Other suitable additive materials, include additive materials, such as glass, metal-plated glass, metal particles containing glass, metal oxides, doped metal oxides, intrinsically conductive polymers, ceramic and organic fibers.

In another aspect of the present invention, the concept of bulk resistivity of a material is an intrinsic property of the material and can be determined from a sample of uniform cross-section. The bulk resistivity, expressed in units of ohms-cm, is the resistance of such a sample times the cross-sectional area divided by the length of the sample. The bulk resistivity can vary somewhat with the applied voltage. In contrast, the surface or sheet resistivity (frequently expressed as ohms per square) is not an intrinsic property of a material but depends upon the thickness of the matrix and is proportional to the bulk resistivity divided by the thickness of the matrix.

According to an aspect of the present invention, the resistivity of the composite varies approximately proportionately to the bulk resistivity of the individual fibers and the volume fraction of the fibers in the matrix. These two parameters can be selected independently. For any particular fiber or corresponding powder resistivity, the resistivity of the coated matrix can be varied over roughly an order of magnitude by changing the volume fraction of the fiber or corresponding powder forms. Thus, the bulk resistivity of those fibers or powders is chosen at least to be within approximately three orders of magnitude or less, but below the bulk resistivity desired in the final composite. When the fibers or corresponding powder forms are mixed with the insulating matrix-forming binder in an amount above the percolation threshold, the resistivity of the resulting matrix changes in an approximately linear manner, especially at loadings significantly exceeding the initial point where percolation occurs. Fine tuning of the final resistivity may be accurately controlled by this approximately linear change in the resistivity—filler loading relationship. Fibers, which may be in powder form, may be utilized in the present invention include fibers having a bulk resistivity between about $10^{-2}$ ohms-cm to about $10^6$ ohms-cm. These resistivities permit preparation of films having electrical sheet resistivities between about $10^2$ ohms/square to $10^{13}$ ohms/square.

In another aspect of the present invention, powder fibers are dispersed in a polymer binder at a volume loading sufficiently above the percolation threshold so that the resistivity of the matrix is low. The fibers are at least present in an amount of about 15 volume percent to about 85 volume percent based on volume of the binder, and more particularly in an amount of about 35 volume percent to about 65 volume percent.

According to a further aspect of the present invention, the electrophotographic system and/or components thereof have been found to maintain electrically conductive and/or insulating properties when used or tested in standard operating or ambient environmental conditions (i.e., typical or conventional operating conditions under which the present invention is used), which may include changes in temperature, humidity, atmosphere, atmospheric pressure changes, etc. The present invention has been tested under ambient environmentally simulated temperature and relative humidity conditions, which is exemplified by the "C Zone", which has a temperature of at least 15.55° C. (or 60° F.) and 20% relative humidity, and/or the "A Zone" which has a temperature of 26.6° C. (or 80° F.) and 80% relative humidity. Significantly, samples prepared using materials described in the present invention exhibited negligible change in electrical conductivity when subjected to testing at both "A" and "C" zone conditions. Thus, the present invention may be stable under temperature and humidity ranges as defined from about 15.6° C. (i.e., 60° F.) with a 20% relative humidity to about 26.6° C. (i.e., 80° F.) with a 80% relative humidity. In contrast, most material compositions used to prepare controlled conductivity materials, such as for use in the present invention, which are electrically conductive or insulating are sensitive to changes in humidity and temperature. Moreover, an electrical component and/or an electrophotographic system of the present invention, which includes an electrically conductive composition as described herein, also is stable at high temperature ranges of about 100° C. to about 1900° C. under such typical or conventional operating conditions.

EXAMPLES

Example 1

Preparation of Partially Pyrolyzed Polyacrylonitrile (PAN) in Viton GF, Conductive Stock Dispersion A small bench top attritor was charged with 2000 grams of 3/16 stainless steel shot, 10 grams of Viton GF resin and approximately 150 mls of methylethyllketone (MEK) solvent. A 10 gram sample of partially pyrolyzed (PAN) fiber was chopped onto short lengths of approximately ¼ inch to ½ inch and slowly introduced into the attritor operating at slow speed. The slurry was attrited for a period of about 3 hours. At this time, the slurry was filtered through a screen to separate out the shot and collect the PAN/Viton-GF dispersion. The slurry was well dispersed and had the appearance of a fine carbon black dispersion. Thin layers were coated on Kapton and stainless steel substrates and submitted for electrical analysis. The coated layers were determined to have a bulk resistivity of approximately $1 \times 10^5$ ohm-cm.

Example 2

Preparation of Partially Pyrolyzed Polyacrylonitrile (PAN) in Viton GF, Conductive Stock Dispersion Partially pyrolyzed polyacrylonitrile fibers were obtained from Amoco in the form of a continuous tow of 12,000 filaments of ~7-10 µm diameter each. The fibers were custom prepared and had a measured resistivity of about $1 \times 10^5$ ohm-cm. The fibers were chopped into small lengths (~¼ inch) prior to milling. About 10 grams of chopped fibers along with 10 g Viton GF fluoroelastomer (Dupont) and 200 g methylisobutylketone (MIBK) solvent was added to a small bench top attritor containing about 2000 g of 3/8 inch stainless steel ball media. The mixture was attrited at moderate speed for about 3 hours. The resultant dispersion was separated from the media by straining through a wire mesh screen and collected in a 16 oz. polyethylene bottle. This stock dispersion has a very high filler loading and was further diluted with quantities of Viton GF solution to prepare a series of dispersions with decreasing amounts of conductive filler loading. Table 1 shows a (PAN) concentration series prepared using this stock dispersion diluted with various amounts of fluoroelastomer. This series of dispersions were drawbar coated onto insulating polyimide sheets to yield thin, coated layers of about 0.001 inch thickness after drying and postcure for 1 hour at 150° C. in a forced air programmable oven. The coated layers were analyzed and exhibited the following measured resistivities.

| Sample # | Filler (PAN) g. | Viton GF g. | pph Filler (PAN) | Surface Resistivity (ohm/sq.) |
|---|---|---|---|---|
| 0 | 1.0 | 1.0 | 100.0 | 8.90E+08 |
| 1 | 1.0 | 1.6 | 62.5 | 1.25E+10 |
| 2 | 1.0 | 2.2 | 45.5 | 7.60E+10 |
| 3 | 1.0 | 2.8 | 35.7 | 3.80E+11 |
| 4 | 1.0 | 3.4 | 29.4 | 8.90E+11 |
| 5 | 1.0 | 4.0 | 25.0 | 9.60E+12 |
| 6 | 1.0 | 4.6 | 21.7 | 1.60E+13 |

Example 3

Preparation of Partially Pyrolyzed Polyacrylonitrile (PAN) in Viton GF, Conductive Stock Dispersion Partially pyrolyzed polyacrylonitrile fibers were obtained from Celanese in the form of a continuous tow of 12,000 filaments of ~7-10 µm diameter each. The fibers were custom prepared and had a measured resistivity of about $1 \times 10^4$ ohm-cmm. The fibers were chopped into small lengths (~¼ inch) prior to milling. About 10.76 grams of chopped fibers along with 15.0 g Viton GF fluorelastomer (Dupont) and 200 g MIBK solvent was added to a small bench top attritor containing about 2000 g of ⅜ inch stainless steel ball media. The mixture was attriated at moderate speed for about 5 hours. The resultant dispersion was separated from the media by straining through a wire mesh screen and collected in an 16 oz polyethylene bottle. This stock dispersion has a very high filler loading and was further diluted with quantities of Viton GF solution to prepare a series of dispersions with decreasing amounts of conductive filler loading. Table 2 shows a (PAN) concentration series prepared using this stock dispersion diluted with various amounts of fluoroelastomer. This series of dispersions were drawdown coated onto insulating polyimide sheets to yield thin, coated layers of about 0.001 into thickness after drying and postcure for 1 hour at 150° C. in a forced air programmable oven. The coated layers were analyzed and exhibited the following measured resitivities.

TABLE 2

| Sample # | Filler (PAN) g. | Viton GF g. | pph Filler (PAN) | Surface Resistivity (ohm/sq) |
|---|---|---|---|---|
| 1 | 0.90 | 1.25 | 72 | 8.00E+06 |
| 2 | 0.90 | 1.59 | 56.6 | 7.60E+07 |
| 3 | 0.90 | 1.86 | 48.4 | 1.20E+08 |
| 4 | 0.90 | 2.16 | 41.7 | 4.00E+08 |
| 5 | 0.90 | 2.76 | 32.6 | 2.80E+09 |
| 6 | 0.45 | 1.52 | 29.7 | 1.58E+10 |
| 7 | 0.45 | 1.68 | 26.8 | 7.96E+10 |
| 8 | 0.45 | 1.98 | 22.7 | 6.00E+11 |
| 9 | 0.45 | 2.85 | 15.8 | 1.10E+13 |
| 10 | 0.23 | 3.92 | 5.7 | 1.50E+13 |

Although particular embodiments have been depicted and described in detail herein, it will be apparent to those skilled in the relevant art that various modification, additions, substitutions, and the like can be made without departing from the spirit of the invention and these are therefore considered to be within the scope of the invention as defined in the claims which follow.

Additionally, the recited order of processing elements or sequences, or the use of numbers, letters, or other designations therefor, is not intended to limit the claimed processes to any order except as may be specified in the claims.

What is claimed is:

1. An electrical component in an electrophotographic system, comprising:
   an electrically conductive composition which includes a partially pyrolized carbon based powder filler and a host matrix.

2. The electrical component according to claim 1, wherein the electrical component is selected from the group consisting of an intermediate transfer belt, a bias transfer belt, a bias charging belt, a bias transfer roll, a bias charging roll, a developer roll, developer belt, fuser belt, pre and mid heater belt, fuser roll, pressure roll, and donor roll.

3. The electrical component according to claim 2, wherein the electrical component is a bias transfer roll.

4. The electrical component according to claim 2, wherein the electrical component is a bias charging roll.

5. The electrical component according to claim 2, wherein the electrical component is an intermediate transfer belt.

6. The electrical component according to claim 2, wherein the electrical component is a fuser belt.

7. The electrical component according to claim 1, wherein the electrically conductive composition is stable at high temperature ranges of about 100° C.to about 1900° C.

8. The electrical component according to claim 1, wherein the electrically conductive composition further is stable under ambient environmental use conditions, which include a range of temperatures and humidity levels from about 15.5° C. and 20% relative humidity to about 26.6° C. and 80% relative humidity.

9. The electrical component according to claim 1, wherein the partially pyrolized carbon based powder filler is pyrolized organic polymer based fiber or resin in a powder form.

10. The electrical component according to claim 1, wherein the partially pyrolized carbon based powder filler is carbonized polyacrylonitrile fiber or filler in a powder form.

11. The electrical component according to claim 1, wherein the partially pyrolized carbon based powder filler is selected from the group consisting of a fine powder of spheres, near spheres, flakes, needles, shards, rods and mixtures and blends thereof.

12. The electrical component according to claim 1, wherein the host matrix has electrically conductive resistive properties or insulating properties.

13. The electrical component according to claim 1, wherein the host matrix further comprises one or more organic polymer(s).

14. The electrical component according to claim 13, wherein the organic polymer is selected from the group consisting of polyesters, polyamides, polyvinyls, poly-cellulose derivatives, fluoroelastomers, polysiloxanes, polysilanes, polycarbazoles, polyphenothiazines, polyimides, polyetherketones, polyetherimides, polyethersulphones, polyurethanes, polyether urethanes, polyester urethanes, polyesters, polytetrafluoroethylenes, polycarbonates and polyacrylonitriles, poly(ester-imides), polyfluoroalkoxys, poly(amide-imides) and copolymers and mixtures thereof.

15. The electrical component according to claim 1, wherein the electrically conductive composition comprises about 0.1% to 99% by weight pyrolized carbon based powder filler.

16. The electrical component according to claim 15, wherein the electrically conductive composition comprises about 5% to 50% by weight pyrolized carbon based powder filler.

17. The electrical component according to claim 1, wherein the partially pyrolized carbon based powder fillers are fine powders with a particle size from about 0.001 microns to about 10 microns.

18. The electrical component according to claim 17, wherein the partially pyrolized carbon based powder fillers have a particle size of less than about 0.9 microns.

19. The electrical component according to claim 17, wherein the partially pyrolized carbon based powder filler has a length to cross-sectional diameter ratio of 0.01 to 1000.

20. The electrical component according to claim 1, wherein the electrically conductive composition further comprises additive materials selected from the group consisting of glass, metal-plated glass, metal particles containing glass, metal oxides, doped metal oxides, intrinsically conductive polymers, ceramic and organic fibers.

21. The electrical component according to claim 1, wherein the electrically conductive composition further comprises filler(s) having magnetic properties.

22. The electrical component according to claim 1, wherein the partially pyrolized carbon based powder fillers have a D.C. volume resistivity of from about $1\times10^{-5}$ ohm-cm to about $1\times10^{13}$ ohm-cm.

23. An electrophotographic system comprising an electrical component, which includes an electrically conductive composition, which is stable at high temperature, and includes a partially pyrolized carbon based powder filler and a compatible host matrix.

24. The electrophotographic system of claim 23, wherein the electrically conductive matrix composition is stable at high temperatures from about 100° C. to about 1900° C.

25. The electrophotographic system of claim 24, wherein the electrically conductive matrix composition further is stable under ambient environmental use conditions, which include a range of temperatures and humidity levels from about 15.5° C. and 20% relative humidity to about 26.6° C. and 80% relative humidity.

26. The electrophotographic system according to claim 24, wherein the electrical component is selected from the group consisting of an intermediate transfer belt, a bias transfer belt, a bias charging belt, a bias transfer roll, a bias charging roll, a developer roll, developer belt, fuser belt, fuser roll, pre and mid heater belt, pressure roll, and donor roll.

27. The electrophotographic system according to claim 24, wherein the partially pyrolized carbon based powder fillers are carbonized polyacrylonitrile fibers in a powder form.

28. The electrophotographic system according to claim 24, wherein the partially pyrolized carbon based powder fillers are pyrolized organic polymer based fibers or resins in a powder form.

29. The electrophotographic system according to claim 24, wherein the matrix further comprises an organic polymer selected from the group consisting of polyesters, polyamides, polyvinyls, poly-cellulose derivatives, fluoroelastomers, polysiloxanes, polysilanes, polycarbazoles, polyphenothiazines, polyimides, polyetherketones, polyetherimides, polyethersulphones, polyurethanes, polyether urethanes, polyester urethanes, polyesters, polytetrafluoroethylenes, polycarbonates and polyacrylonitriles and copolymers and mixtures thereof.

30. The electrophotographic system according to claim 24, wherein the electrically conductive composition comprises from about 0.1% to about 99% by weight pyrolized carbon based powder fillers.

* * * * *